(12) United States Patent
Nelsen et al.

(10) Patent No.: US 10,527,075 B2
(45) Date of Patent: Jan. 7, 2020

(54) TOP DRIVE TORQUE RESTRAINT DEVICE

(71) Applicant: NELSEN TECHNOLOGIES INC., Sherwood Park (CA)

(72) Inventors: Blair Nelsen, Sherwood Park (CA); James Chisholm, Camrose (CA); Cody Gunderson, Sherwood Park (CA)

(73) Assignee: Nelsen Technologies Inc., Sherwood Park (CA)

( * ) Notice: Subject to any disclaimer, the term of this patent is extended or adjusted under 35 U.S.C. 154(b) by 15 days.

(21) Appl. No.: 15/880,779

(22) Filed: Jan. 26, 2018

(65) Prior Publication Data

US 2018/0223884 A1 Aug. 9, 2018

Related U.S. Application Data

(60) Provisional application No. 62/455,735, filed on Feb. 7, 2017.

(51) Int. Cl.
*E21B 3/02* (2006.01)
*E21B 15/00* (2006.01)
*E21B 41/00* (2006.01)
*F16B 2/10* (2006.01)

(52) U.S. Cl.
CPC ............... *F16B 2/10* (2013.01); *E21B 41/00* (2013.01); *E21B 3/02* (2013.01); *E21B 15/00* (2013.01)

(58) Field of Classification Search
CPC . E21B 3/02; E21B 15/00; E21B 41/00; F16B 2/10
See application file for complete search history.

(56) References Cited

U.S. PATENT DOCUMENTS

| | | | | |
|---|---|---|---|---|
| 3,994,350 A | * | 11/1976 | Smith | E21B 19/084 |
| | | | | 175/85 |
| 4,314,611 A | * | 2/1982 | Willis | E21B 21/02 |
| | | | | 173/197 |
| 5,107,940 A | * | 4/1992 | Berry | E21B 7/023 |
| | | | | 175/122 |
| 7,584,810 B1 | * | 9/2009 | McKnight, Jr. | E21B 15/00 |
| | | | | 175/162 |
| 7,828,086 B2 | * | 11/2010 | Lesko | E21B 7/023 |
| | | | | 166/77.1 |
| 8,757,277 B2 | | 6/2014 | Dekker et al. | |
| 8,893,825 B1 | * | 11/2014 | Akerman | E21B 17/07 |
| | | | | 175/113 |
| 9,399,890 B2 | | 7/2016 | Mark | |
| 2011/0203820 A1 | * | 8/2011 | Marica | B61B 15/00 |
| | | | | 173/1 |

(Continued)

FOREIGN PATENT DOCUMENTS

JP 4818758 B2 11/2011

*Primary Examiner* — Matthew R Buck
(74) *Attorney, Agent, or Firm* — McCoy Russell LLP

(57) ABSTRACT

A torque restraint device for connection to a top drive or to a travelling block of a drilling rig. The device is reversibly connectable to a guide track connected to a mast of the drilling rig. The device includes a main body supporting a pair of lockable jaws connected with a hinge body. The jaws are configured to form a closed and locked bracket for engaging the guide track and configured to pivot on the hinge body to provide an open bracket to facilitate disengagement of the device from the guide track. The hinge body forms a connection between at least one of the jaws and the main body.

24 Claims, 7 Drawing Sheets

(56) References Cited

U.S. PATENT DOCUMENTS

2014/0138081 A1    5/2014    Yorga et al.
2014/0182868 A1*    7/2014    Bowley .................... E21B 3/02
                                                                                              173/1

* cited by examiner

TOP DRIVE TORQUE RESTRAINT DEVICE

CROSS-REFERENCE TO RELATED APPLICATIONS

This application claims the benefit of U.S. Provisional Application No. 62/455,735 filed Feb. 7, 2017, entitled "TOP DRIVE TORQUE RESTRAINT DEVICE", which is incorporated by reference in its entirety for all purposes.

FIELD OF THE INVENTION

The invention relates to drilling rig technologies and more specifically to restraints for preventing transfer of torque generated from rotation of a drill string by a top drive.

BACKGROUND

A system known as a "top drive" is used on drilling rigs to power rotation of the drill string. It consists of one or more motors (electric or hydraulic) connected via appropriate gearing to the drill string. In a typical arrangement, the top drive is suspended from the travelling block to allow the top drive to travel up and down along the mast.

Top drives require a torque restraining system to prevent rotation of the top drive itself due to compensatory transfer of torque. Such torque restraint systems are well known and usually take the form of a pair of guide tracks attached to opposite sides of the mast coupled with support arms extending from the body of the top drive and from the travelling block. The support arms attach to the guide tracks via a bracket structure with sliding plates or rollers. This connection to the mast via the guide tracks prevents transfer of torque to the top drive. The sliding plates or rollers allow the coupling to slide up and down the guide track as the top drive moves up and down with raising and lowering of the traveling block.

U.S. Pat. No. 5,107,940, incorporated herein by reference in its entirety, describes a torque restraint system for a top drive unit in a drilling rig, in which rigid torque arms rotate about a horizontal axis to transmit reactive force from the power swivel to the mast to prevent rotation of the power swivel about a vertical axis. The rotatability of the torque arms also allows lateral displacement of the motor from an operating position to a parked position behind the vertical axis of the well bore. This torque restraint system can be utilized in conjunction with an inclined mast.

U.S. Pat. No. 8,757,277, incorporated herein by reference in its entirety, describes a torque reaction device for coupling a pipe running tool to a top drive assembly on a drilling rig. In one embodiment, a system for coupling a pipe segment to a pipe string includes a top drive assembly, a pipe running tool, and a torque reaction device. The top drive assembly includes an output shaft and a link extending from the top drive. The top drive is operative to rotate the output shaft with respect to the link. The pipe running tool is coupled to the output shaft and can be engaged with a pipe segment to transmit torque from the output shaft to the pipe segment. The torque reaction device couples the pipe running tool to the link.

U.S. Pat. No. 8,893,825, incorporated herein by reference in its entirety, describes a telescoping derrick with two rectangular telescoping section each defining rear legs and front legs defining a longitudinal channel, each set of front legs further defining rails attached to inner facing surfaces upon which lateral guide tracks of the improved top drive assembly are led. Each lateral guide tracks provide a set of parallel channel segments having a friction reducing inner lining and an upper and lower track wheel which travel upon the facing surface of each guide rail for smooth and secure travel up and down the derrick during drilling and completion operations.

U.S. Pat. No. 9,399,890, incorporated herein by reference in its entirety, describes a transportable rig apparatus for well completion operations which readily resists or negates the effects of dynamic wind forces or other weather phenomena. The transportable rig apparatus provides a mast assembly that can extend in a generally vertical direction, e.g. perpendicular to the rig carrier and/or ground surface, such that the rig can be placed directly adjacent to a wellbore.

U.S Patent Publication No. 20140138081, incorporated herein by reference in its entirety, describes a well service rig for tripping rods and tubulars. The well service rig includes a service rig base unit, a mast coupled to the well service rig base unit movable between a folded position and an upright position, a vertical guide mounted to the mast, and a traveling block system coupled to the vertical guide at a first end and configured to travel up and down at least a portion of a length of the vertical guide. The traveling block system can be coupled to a rod, a tubular, or both at a second end.

U.S Patent Publication No. 20140182868, incorporated herein by reference in its entirety, describes a top drive system having a top drive, a bogey chassis, wherein the top drive is coupled with the bogey chassis, an upper bushing coupling the bogey chassis to a torque track, and a lower bushing coupling the bogey chassis to the torque track, wherein the upper and lower bushings are configured to translate along the torque track.

Japan Patent 4818758B2, incorporated herein by reference in its entirety, describes a mast-rattle prevention device.

There continues to be a need for improvements in existing top drive torque restraint systems to prevent transfer of torque from a rotating drill string back to the top drive.

SUMMARY

In accordance with one aspect of the invention, there is provided a torque restraint device for connection to a top drive or to a travelling block of a drilling rig, the device reversibly connectable to a guide track connected to a mast of the drilling rig, the device comprising a main body supporting a pair of lockable jaws connected with a hinge body, the jaws configured to form a closed and locked bracket for engaging the guide track and configured to pivot on the hinge body to provide an open bracket to facilitate disengagement of the device from the guide track, wherein the hinge body forms a connection between at least one of the jaws and the main body.

In certain embodiments, one jaw of the pair of jaws is a stationary jaw and the other jaw of the pair of jaws is a pivot jaw pivotable on the hinge body, the pivot jaw provided with a pivot arm connectable to the hinge body.

In certain embodiments, the hinge body is a hinge platform formed of two parallel shelves with aligned hinge pin holes and two sets of aligned locking pin holes, the device further including a hinge pin for insertion into the hinge pin holes to provide the pivoting movement of the pivot jaw between a closed form providing the closed bracket and an open form providing the open bracket, the device further comprising a locking pin for insertion into one or the other of the two sets of aligned locking pin holes to lock the jaws in either the closed or open positions by locking the pivot arm of the pivot jaw to one or the other of the two sets of aligned locking pin holes.

In certain embodiments, the hinge pin and the locking pin have substantially identical dimensions and the hinge pin holes and the locking pin holes have substantially identical dimensions.

In certain embodiments, the hinge pin and the locking pin have integrally formed or removable upper tabs to facilitate removal of the hinge pin and the locking pin from their respective hinge pin holes and locking pin holes.

In certain embodiments, the hinge pin holes in the parallel shelves are located substantially centrally between the two sets of aligned pin lock holes.

In certain embodiments, the stationary jaw is permanently attached to the main body.

In certain embodiments, the pair of jaws has interior surfaces at least partially covered with replaceable plastic material to provide sliding surfaces for sliding along the guide tracks of the drilling rig.

In certain embodiments, the device further comprises a pair of hinge platforms, a pair of hinge pins and a pair of locking pins, the hinge platforms located at opposite ends of the torque restraint device, wherein each hinge platform is formed of two parallel shelves with aligned hinge pin holes and two sets of aligned locking pin holes.

In certain embodiments, the hinge pins and the locking pins each have substantially identical dimensions and the hinge pin holes and the locking pin holes have substantially identical dimensions.

In certain embodiments, the hinge pins and the locking pins each have integrally formed or removable upper tabs to facilitate removal of the hinge pins and the locking pins from their respective hinge pin holes and locking pin holes.

In certain embodiments, the hinge pin holes in the parallel shelves are located substantially centrally between the two sets of aligned pin lock holes.

In certain embodiments, the stationary jaw is permanently attached to the main body.

In certain embodiments, the pair of jaws has interior surfaces at least partially covered with replaceable plastic material to provide sliding surfaces for sliding along the guide tracks of the drilling rig.

Another aspect of the invention is a top drive for a drilling rig having a pair of torque restraint devices as recited herein, attached at opposed lateral positions of the top drive for connection to opposing guide tracks of a mast of a drilling rig.

Another aspect of the invention is a travelling block for a drilling rig having a pair of torque restraint devices as recited herein, attached at opposed lateral positions of the travelling block for connection to opposing guide tracks of a mast of a drilling rig.

Another aspect of the invention is a kit for assembling torque restraints on a top drive of a drilling rig, the kit comprising a pair of torque restraints as recited herein together with instructions for installation of the torque restraints on the top drive.

In certain embodiments, the kit further comprises an additional pair of torque restraint devices as recited herein, for assembly on a travelling block of the drilling rig together with instructions for installation of the additional pair of torque restraint devices on the travelling block.

In certain embodiments, the kit further comprises instructions for engaging and disengaging the torque restraint devices from guide tracks of the drilling rig.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale. Instead, emphasis is placed upon illustrating the principles of various embodiments of the invention. Similar reference numerals indicate similar components. A number of possible alternative features are introduced during the course of this description. It is to be understood that, according to the knowledge and judgment of persons skilled in the art, such alternative features may be substituted in various combinations to arrive at different embodiments of the present invention.

DETAILED DESCRIPTION

Rationale

As noted above, torque restraint systems are used on drilling rigs which use a top drives and an associated travelling block. The torque restraint systems prevent rotation of the body of the top drive which would be induced by rotation of the drill string driven by the top drive. While transfer of torque to the travelling block of the rig does not occur, it is also advantageous to restrain the travelling block using a similarly constructed torque restraint device because occasions when the drilling line above the travelling block becomes slack (for example, when the drill string hits the bottom of the wellbore), the top drive acts as a pivot point and the travelling block can swing with sufficient range to damage nearby equipment. The known torque restraint systems allow the top drive and traveling block to travel up and down along guide tracks connected to the mast of a drilling rig. Systems used in the prior art have a number of variations but the main operating principle is that a clamp/bracket system or a roller system is connected at one end to the top drive and the traveling block and at the other end to a guide track on the mast of the drilling rig (or to a portion of the mast itself).

In these and other similar systems (which may include rollers instead of a sliding bracket or clamp) the torque restraints are bolted in place to prevent them from slipping off the guide track or mast.

The inventors of the present technology are engaged in efforts to improve the safety and efficiency of operation of various types of equipment used on drilling rigs and have recognized that removing torque restraints from guide tracks for maintenance and other tasks is time consuming and dangerous because the operation often requires working on a ladder in the midst of other equipment associated with the rig and workers located on the platform below, which could be struck by tools dropped by workers engaged in such operations.

In an effort to improve the ability to quickly disengage torque restraints from guide tracks on the mast of a drilling rig without a need for tools, the inventors have developed a quick release hinge system in an improved torque restraint device. This quick release torque restraint device, described in detail hereinbelow, uses a hinge a lock pin arrangement for each connection point of the torque restraint device.

An Example Embodiment of a Bracket-Type Prior Art Torque Restraint Device

Figure 1:
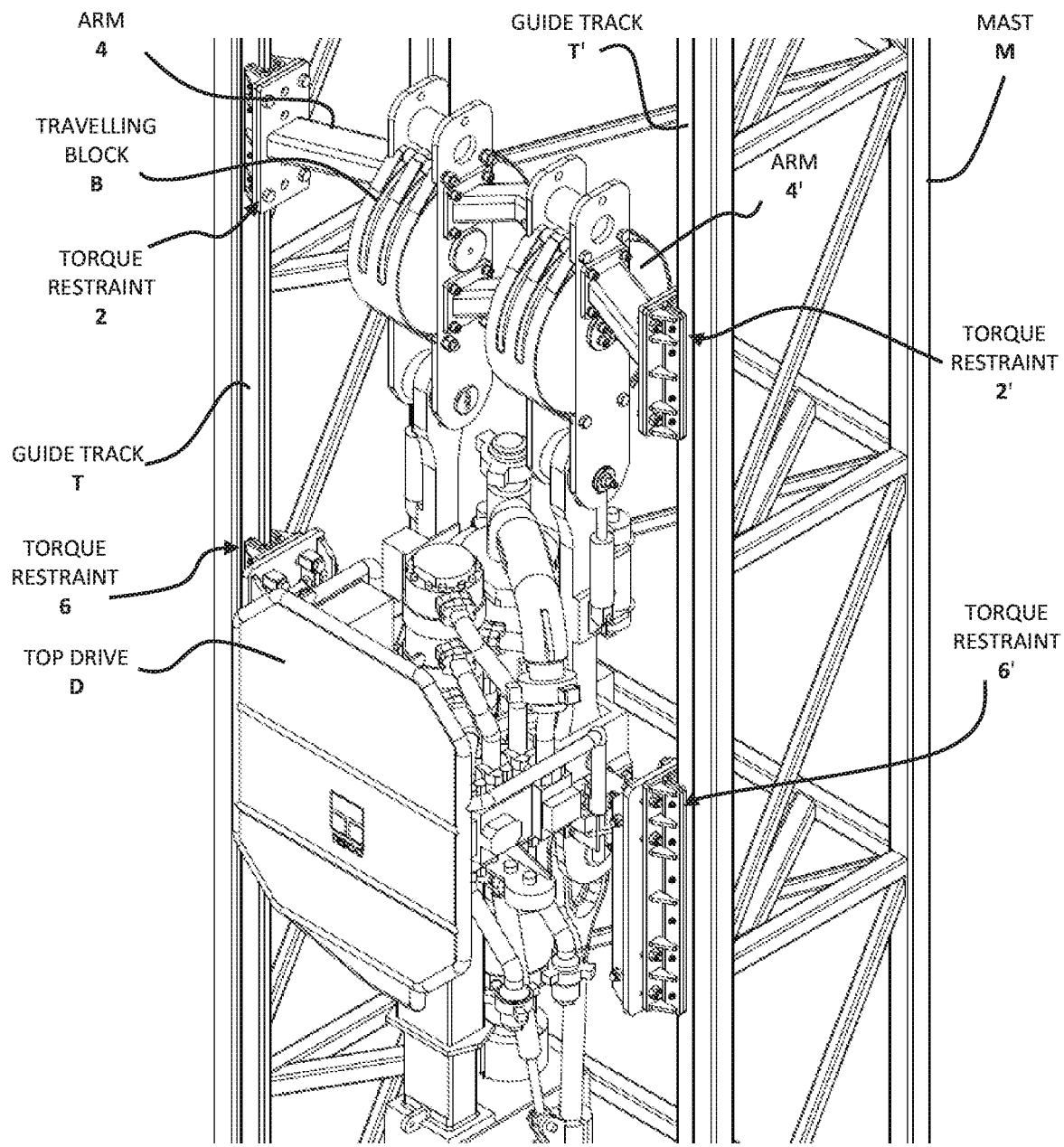
FIG. 1 is a perspective view of an upper portion of a drilling rig showing a top drive D and travelling block B in association with guide tracks T and T' attached to a mast M. Examples of conventional bracket-type torque restraints 2 and 2' are connected between the travelling block B and the guide tracks T and T' and examples of conventional bracket-type torque restraints 6 and 6' are connected between the top drive D and the guide tracks T and T'.
Figure 2:
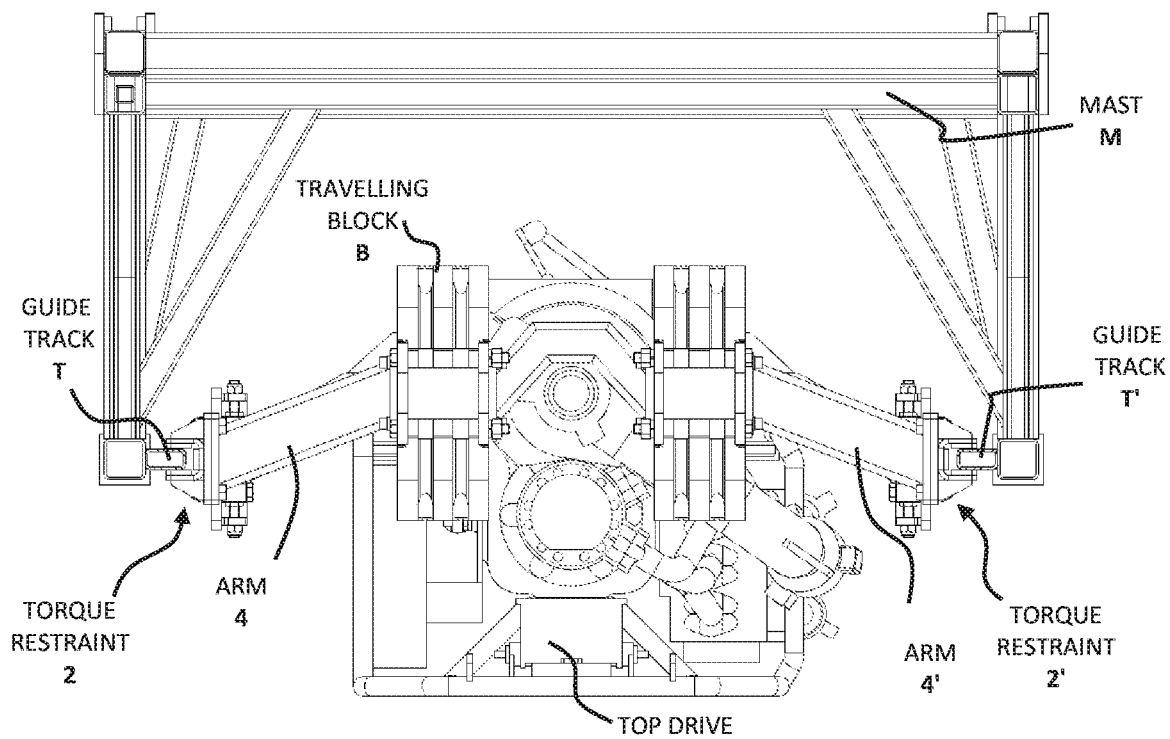
FIG. 2 is a top view of the upper portion of a drilling rig as shown in FIG. 1.
Figure 3:
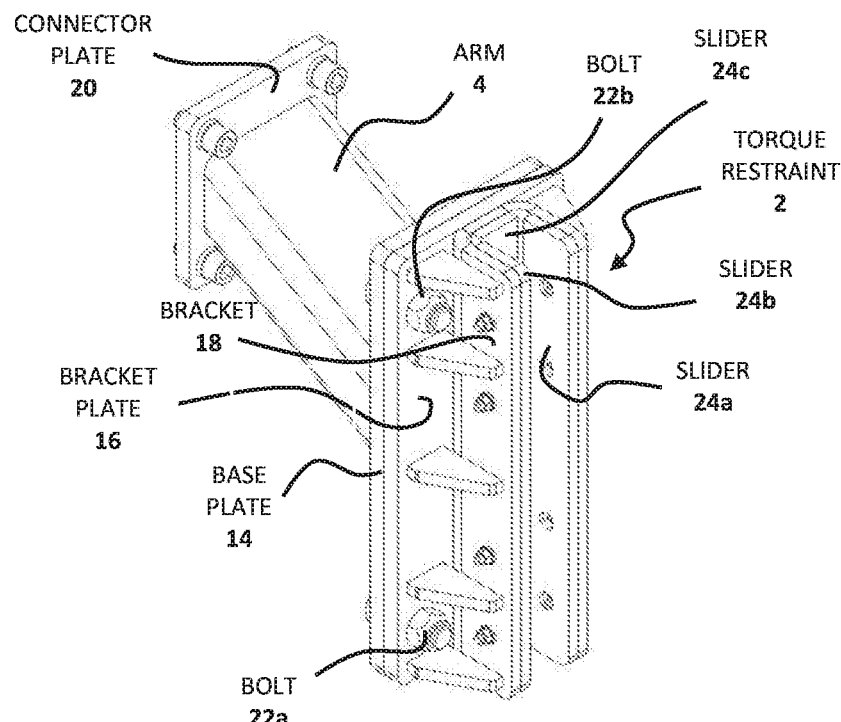
FIG. 3 is a perspective view of one of the conventional bracket-type torque restraint devices 2, used to connect the travelling block to the guide track T in FIGS. 1 and 2.

In FIGS. 1 to 3, there are shown various views of an example of a set of torque restraint devices known in the art. This particular set of torque restraints was produced by the inventors prior to development of an embodiment of the present invention and therefore has an overall general structure which is similar to this embodiment which will be described hereinbelow. It is to be understood that a number of variations of the design of prior art torque restraints are known in the art and are typically connected to guide tracks or to a portion of the mast itself using a bolt mechanism.

FIG. 1 illustrates a front perspective view of a top drive D hanging from a traveling block B with the upper traveling block support cables omitted to preserve clarity. It is seen that both the traveling block B and the top drive D are provided with torque restraint devices. Torque restraint devices 2 and 2' have arms 4 and 4' which are connected to the traveling block B and torque restraint devices 6 and 6' are likewise connected to the top drive D with shorter connector parts which are generally hidden in the perspective of FIG. 1 and the top view of FIG. 2. It is seen that the lower torque restraint devices 6 and 6' are longer than the upper torque restraint devices 2 and 2' in order to better prevent transfer of torque to the top drive D. Otherwise, the torque restraint devices have similar features. These torque restraint devices 2, 2', 6 and 6' each provide a bracket which engages their respective guide tracks T and T'.

The same arrangement is shown in a top view in FIG. 2, where only the travelling block torque restraints 2 and 2' are visible (the traveling block torque restraints 6 and 6' are hidden in this view) and it is more clearly seen that the torque restraints 2 and 2' each have a gripping portion for engaging their respective guide tracks T and T' which are connected to the mast M.

In FIG. 3, there is shown a perspective view of the prior art torque restraint 2 by itself. The main body of the torque restraint 2 is provided by a base plate 14, to which is connected a bracket plate 16 using a set of four bolts (of which only bolts 22a and 22b are visible in this perspective view). A bracket 18 is held in place on the bracket plate 16 and the inner surfaces of the bracket are provided with sliders 24a, 24b and 24c which are constructed of material such as rigid plastic that has a relatively low frictional coefficient to allow the torque restraint device 2 to slide up and down along the guide track T. The back side of the base plate 14 is connected to an arm 4 which extends to a connector plate 20 provided for bolting the torque restraint device 2 to the travelling block B.

As noted above, the bracket plate 16 is bolted to the base plate 14. This provides a mechanism for attaching and detaching the torque restraint device from its corresponding guide track T. Such a bolt mechanism is common in the art and used in conjunction with other torque restraint systems that have different mechanisms for coupling the torque restraint device to guide tracks such as encased rollers instead of sliding brackets. One example of such a system is marketed by National Oilwell Varco (https://www.nov.com/Segments/Rig_Systems/Offshore/Top_Drive_Systems/Fixed_Electric_Top_Drives/TDS_8SA_Top_Drive/TDS-8_Top_Drive.aspx, incorporated herein by reference in its entirety).

An Example Embodiment of a Pivoting Quick Release Torque Restraint Device

Figure 4A:
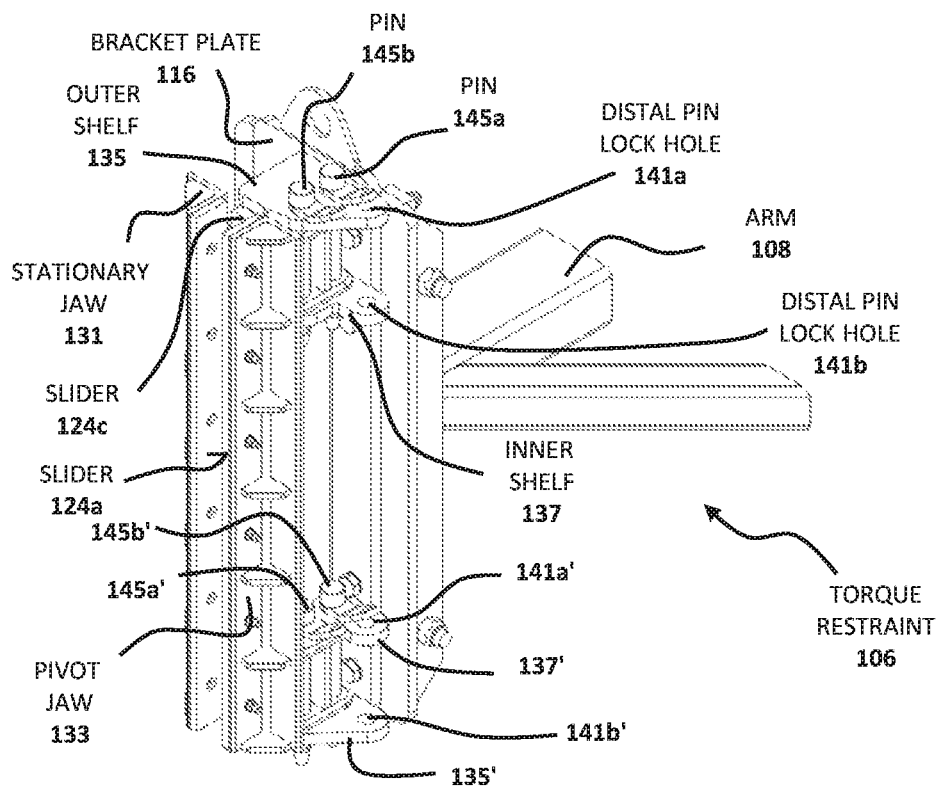
FIG. 4A is a top perspective view of a torque restraint device 106 according to one embodiment of the present invention which has a quick-release system for removing the torque restraint device 106 from its corresponding guide track. The quick release system is in the closed position with the inside of the pivot jaw 133 facing the inside of the stationary jaw 131, thereby forming a bracket for engaging a guide track on the mast of a drilling rig.
Figure 4B:
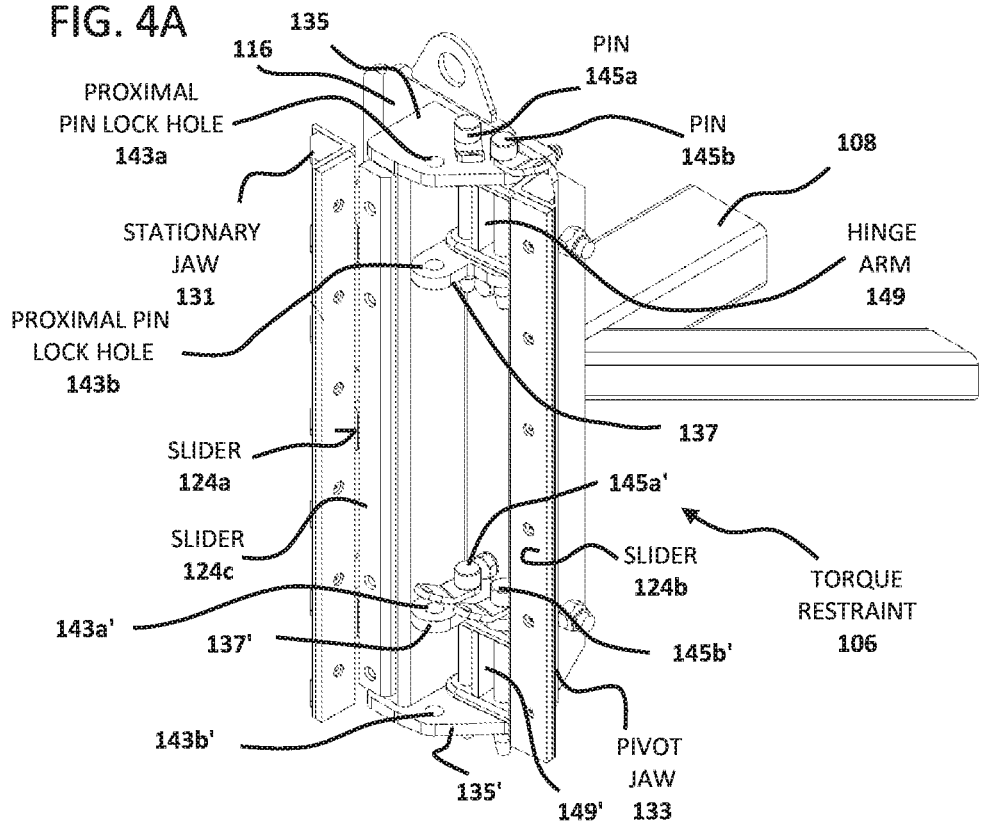
FIG. 4B is a top perspective view of the same torque restraint device 106 of FIG. 4A with the quick release system in the open position with the inside of the pivot jaw 133 facing outward and perpendicular to the surface of the inside of the stationary jaw 131, thereby opening the bracket to allow it to be disengaged from the guide track on the mast of a drilling rig.
Figure 4C:
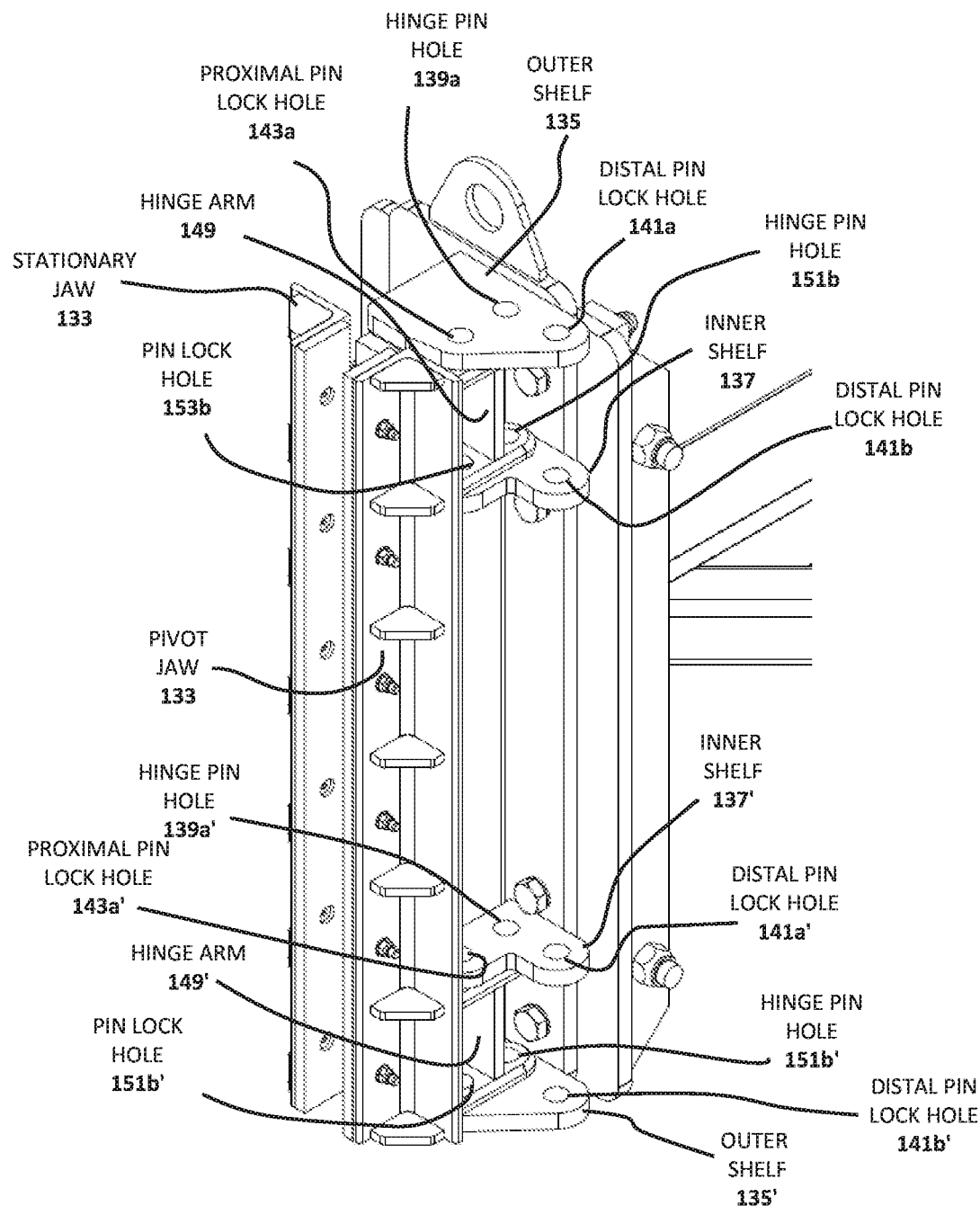
FIG. 4C is a second top perspective view of the torque restraint device 106 with the quick release system in the closed position for the purpose of showing more detail of alignment of pin holes in the outer shelves 135 and 135', the inner shelves 137 and 137' and in the hinge arms 149 and 149'.
Figure 4D:
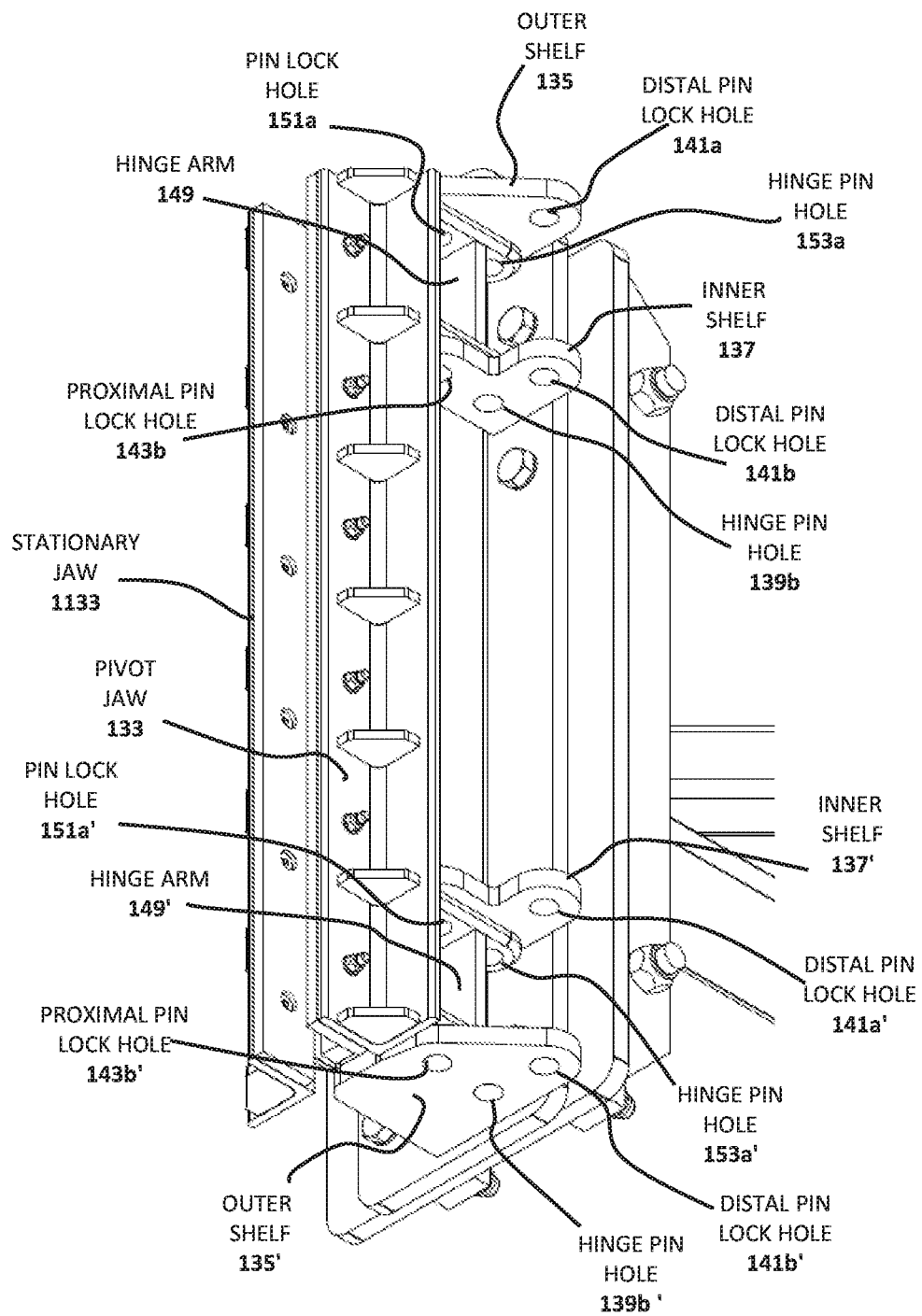
FIG. 4D is a bottom perspective view of the torque restraint device 106 in the closed position for the purpose of showing more detail of alignment of pin holes in the outer shelves 135 and 135', the inner shelves 137 and 137' and in the hinge arms 149 and 149'.
Figure 5:
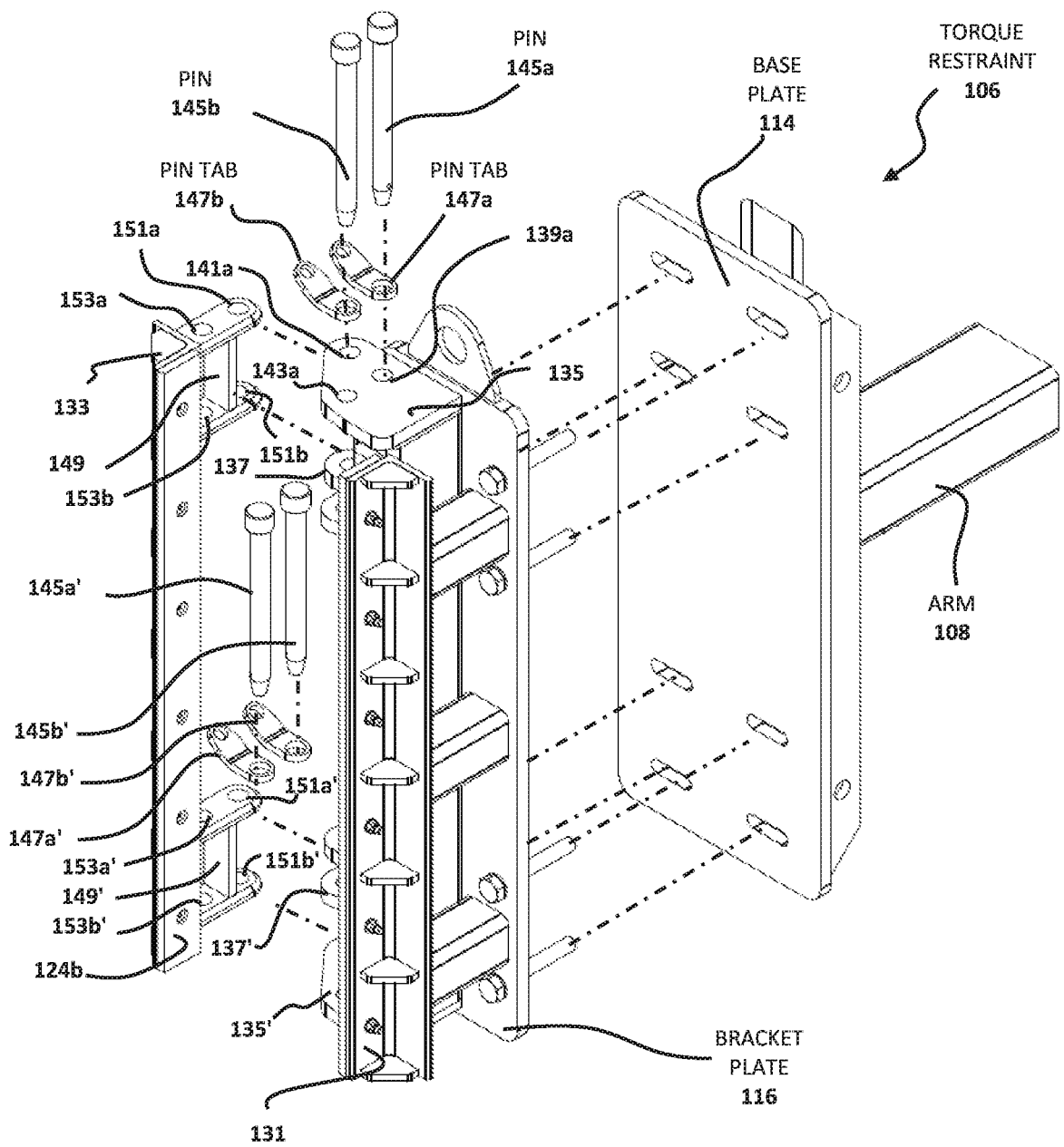
FIG. 5 is an exploded view of the torque restraint device 106.

Shown in FIGS. 4 to 6 is an embodiment of an improved torque restraint device 106 which is much easier and safer to operate because engagement to a guide track on the mast of a drilling rig can be performed manually without using any tools. While the torque restraint device 106 is configured for connection to a top drive, the principles of construction and operation are the same for a similar, yet smaller torque restraint device designed for attachment to a travelling block. As such, one embodiment of the invention is a set of four torque restraint devices with one pair of the set configured for connection to a top drive and the other pair of the set being configured for connection to a travelling block. The base connection structure includes a bracket plate 116 with a connected arm 108 for connection to the top drive in a conventional manner.

Jaws and Hinge Platforms—The torque restraint device 106 is configured for connection to a top drive in a conventional manner. The significant improvement provided by the present embodiment is a quick-release system to provide a means for quickly assembling and releasing a bracket formed of a pair of jaws including an L-shaped stationary jaw 131 and an opposed L-shaped pivot jaw 133 which pivots on a hinge platform structure to facilitate engagement and disengagement of the torque restraint system 106 from its guide track T. The interior surfaces of the jaws 131, 133 are provided with sliders 124a, 124b and 124c to facilitate sliding of the bracket formed by the jaws 131 and 133 along a guide track T. In this particular embodiment, the stationary jaw 131 is integrally formed with or connected to a bracket plate 116 which is configured for attachment to a base plate 114 (not seen in FIGS. 4A and 4B but visible in the exploded view of the torque restraint device 106 shown in FIG. 5.

Also integrally formed with or connected to the bracket plate 116 are a series of shelves extending outward from the bracket plate which form the base structure of a pair of upper and lower hinge platforms of similar construction. The top hinge platform includes an outer shelf 135 in a quadrilateral shape with curved corners and an inner shelf 137 in a v-shape with curved extremities. The bottom hinge platform also has an outer shelf 135' and an inner shelf 137' of similar construction. Subsequent description focuses on the top hinge platform including outer shelf 135 and inner shelf 137. It is to be understood that the structure of the bottom hinge platform is structurally and functionally similar and operates in a similar manner, with the exception of the insertion of pins 145a' and 145b' which are inserted with the bottom edges of the heads of the pins 145a' and 145b' against the top of the lower inner shelf 137' rather than against the top of the lower outer shelf 135'.

Alignment of Pin Holes for Closed and Open Positions— As best seen in the top and bottom perspective views of FIGS. 4C and 4D (both with the quick-release system in the closed position), the outer shelf 135 of the torque restraint device 106 has a hinge pin hole 139a, a distal pin lock hole 141a and a proximal pin lock hole 143a. Likewise, the inner shelf 137 has a hinge pin hole 139b, a distal pin lock hole 141b and a proximal pin lock hole 143b, each of which are in permanent alignment with the corresponding holes 139a, 141a and 143a of the outer shelf 135 so that when a pin is pressed into any of the holes of the outer shelf 135, it will also extend through its corresponding hole in the inner shelf 137. The lower hinge platform formed of shelves 135' and 137' has a similar arrangement.

It is seen in FIGS. 4C and 4D and in the exploded view of FIG. 5 that the pivot jaw 133 has a hinge arm 149 with hinge pin holes 151a and 151b and pin lock holes 153a and 153b (as well as a corresponding lower hinge arm 149' with hinge with holes 151a' and 151b' and pin lock holes 153a' and 153b' for coupling to the bottom hinge platform). When the pivot jaw 133 is attached to the torque restraint device 106, the hinge pin holes 151a and 151b of the hinge arm 149 are aligned with the hinge pin holes 139a and 139b prior to insertion of the pin 145a to provide a hinge pin arrangement which allows pivoting between the closed position (FIG. 4A) and the open position (FIG. 4B). After the hinge pin 145a is fully inserted as shown in FIGS. 4A and 4B with the hinge arm 149 in place, the hinge pin 145a has sequentially passed through holes 139a (in outer shelf 135), 151a (in hinge arm 149), 151b (in hinge arm 149), and 139b (in inner shelf 137). A similar scheme is followed for the lower hinge platform except that pin 145a' is sequentially passed through holes 139a' (in inner shelf 137'), 151a' (in hinge arm 149), 151b' (in hinge arm 149') and 139b' (in outer shelf 135').

With pin 145a in place in this arrangement, the pivot jaw 133 is pivotable between the closed and open positions. To lock the pivot jaw 133 in either of these two positions, a second pin 145b is required, as described hereinbelow.

After insertion of the hinge pin 145a, the pivot jaw 133 is pivotable between the open and closed positions. To provide the closed position of FIG. 4A, the empty pin lock holes 153a and 153b of the hinge arm 149 are aligned with the empty proximal pin lock holes 143a and 143b of the outer shelf 135 prior to insertion of the pin 145b. Thus it is to be understood that in FIG. 4A, pin 145b has been sequentially passed through holes 143a, 153a, 153b and 143b. In this position, the length of pin 145b acts as a blocking body against the back surface of the pivot jaw 133 to prevent hinging and pivoting movement of the pivot jaw 133. The same arrangement is followed for alignment and insertion of pin 145b' in the lower hinge platform (except that in t preferred arrangement shown in FIGS. 4A and 4B, the head of pin 145b' rests against the top surface of the inner shelf 137' simply for convenient access following the operation of insertion of pins into the top outer shelf 135. This arrangement also makes it less likely for the pins to disengage from the device by gravity, which would be more likely to occur if the pins were inserted from the bottom surface of the outer shelf 135'.

To provide the open position of FIG. 4B, the pin 145b is removed from pin holes 143a, 153a, 153b and 143b and then the pivot jaw 133 is pivoted on the hinge pin 145a to align the pin lock holes 153a and 153b on the hinge arm 149 with the distal pin holes 141a and 141b. Thus, after pin 145b has attained the position shown in FIG. 4B, it has sequentially passed through pin holes 141a, 153a, 153b and 141b. In this position, hinging and pivoting movement of the pivot jaw 133 back to the open position is prevented. It is advantageous to have such a locked open position in order to avoid having parts pivoting during disengagement of the torque restraint device 106 from the guide track of the mast of a drilling rig. The same arrangement is followed for alignment and insertion of pin 145b' in the lower hinge platform except that the head of pin 145b' rests against the top surface of the inner shelf 137' following the operation of insertion of pins into the top outer shelf 135, as described above for insertion of pin 145b' for the closed position.

To facilitate removal of pins 145a, 145b, 145a' and 145b' from any of the pin holes, the pins 145a, 145b, 145a' and 145b' are each provided with corresponding upper flexible tabs 147a, 147b, 147a' and 147b' formed of steel or other durable metal coated with an anticorrosive material such as phosphate. Each of the tabs has a pair of holes 147a, 147b, 147a' and 147b' (as seen in the exploded view of FIG. 5). One hole for each of the pairs of holes is sufficiently large that one of the pins 145a, 145b, 145a' and 145b' can be pushed therethrough until the pin head is reached. The other hole of the pair is then available to facilitate grasping of the tab to pull the pin out of a pin hole.

In certain embodiments which include a pair of hinge platforms, it is advantageous to provide four pins 145a, 145b, 145a' and 145b' of substantially the same construction so that they can be interchangeably used and to facilitate the process of manufacturing the set of parts for assembly of the torque restraint device. In some embodiments, the pins are formed of steel or other durable metal coated with an anticorrosive material such as phosphate or other similar material to facilitate insertion and removal from the pin holes.

Operation of the Torque Restraints—One example of assembly and operation and disassembly of a single torque restraint device will now be discussed. This description is focused on a single torque restraint device. Assembly, operation and disassembly of an entire set of torque restraint devices on a drilling rig will follow a substantially similar general procedure for each torque restraint device.

Figure 6A:
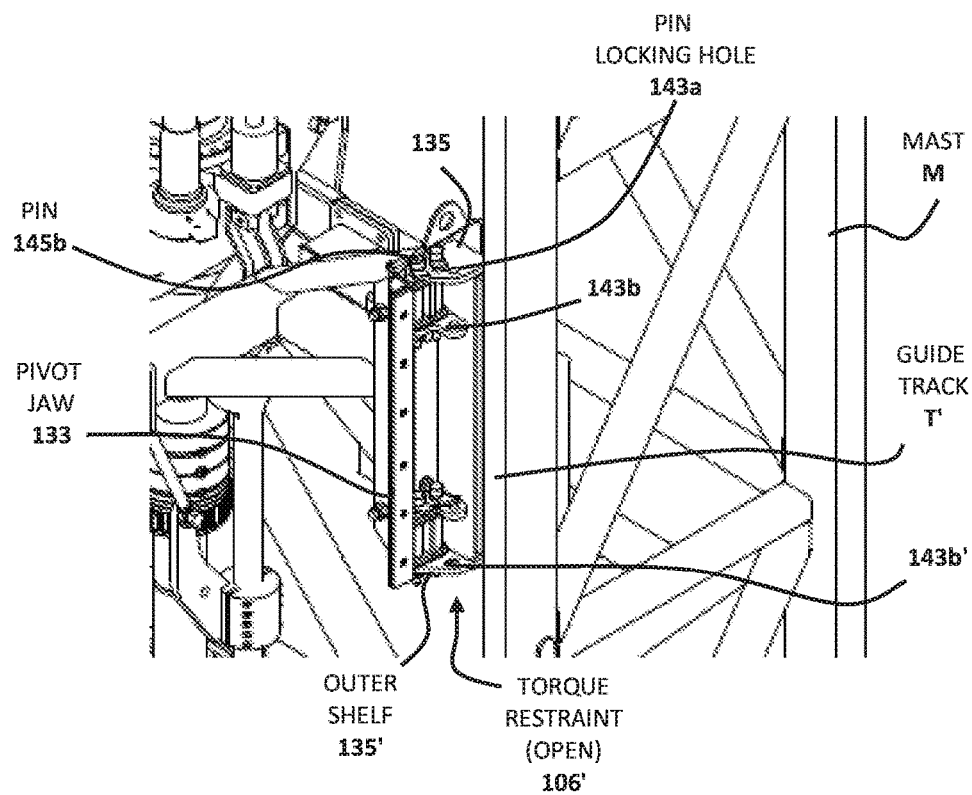
FIG. 6A is a perspective view of torque restraint device 106' with the quick-release system in the open position prior to attachment of the device 106' to a guide track T' on a mast M of a drilling rig and to a top drive D.

With respect to torque restraint device 106, the device is assembled in the locked and open position as shown in FIG. 4B and connected to the top drive. Then the torque restraint device is positioned with its stationary jaw adjacent and parallel to its corresponding guide track T' and its pivot jaw facing away from the guide track T' as shown in FIG. 6A. At this stage, locking pin 145b is removed from pin lock holes 141a, 153a, 153b and 141b and locking pin 145b' is removed from pin lock holes 141a', 153a', 153b' and 141b'.

Figure 6B:
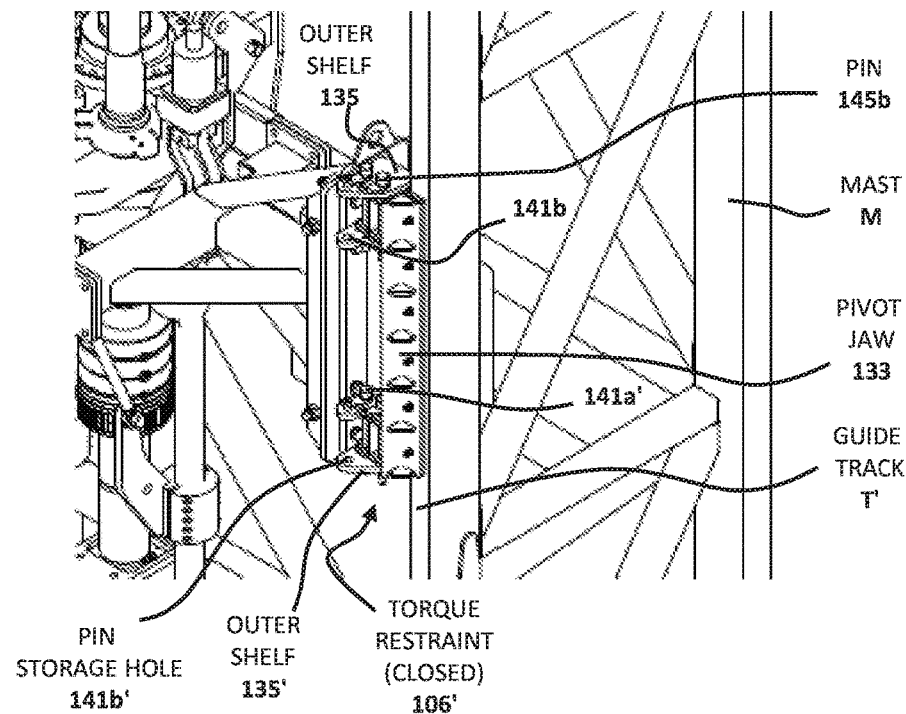
FIG. 6B is a perspective view of the torque restraint device 106' with the quick-release system closed and attached to a guide track T' on a mast M of a drilling rig and to a top drive D.

This operation may be facilitated by grasping pin tabs 147*b* and 147*b*' for additional leverage to increase the manual pulling force. As noted above, no tools are required for this operation and this greatly improves the safety and efficiency of operation of the device 106. At this stage, the pivot jaw 133 can pivot between the closed and open positions and it is moved to the closed position. This movement repositions the pin lock holes 153*a*, 153*b*, 153*a*' and 153*b*' for alignment with the proximal pin lock holes 143*a*, 143*b*, 143*a*' and 143*b*'. Pin 145*b* is then inserted into pin lock holes 143*a*, 153*a*, 153*b* and 143*b* and pin 145*b*' is inserted into pin lock holes 143*a*', 153*a*', 153*b*' and 143*b*'. This locks the pivot jaw 133 in the closed position against the guide track T' as shown in FIG. 6B. Disengagement of the torque restraint device 106 from the guide track T' may be performed simply by reversing the steps described above.

It is to be understood that this entire operation may be conducted in a much more efficient manner than the operation required for a conventional torque restraint device which requires bolts and tools.

Systems, Kits and Alternative Embodiments

The present invention includes embodiments comprising a plurality of individual torque restraint devices in a torque restraint system. In one embodiment, there are provided two torque restraint devices for connection to opposite sides of a top drive with the connection being made with conventional means, Other embodiments include a total of four torque restraint devices with two torque restraint devices configured for connection to a top drive and two additional torque restraint devices configured for connection to a travelling block from which the top drive is suspended.

Sliders may be constructed of substantially flat plastic for sliding engagement with a flat edged guide track, or curved to slide against a curved or tubular guide track.

While the torque restraint device 106 has a pair of hinge platforms located at upper and lower positions of the device 106, the skilled person will recognize that an alternative embodiment may have only a single hinge platform located at an intermediate position to be identified by the skilled person without undue experimentation. This alternative embodiment could be operated with only two longer pins extending the entire length of the torque restraint device with one of the two pins acting as a hinge pin and the other acting as a locking pin for locking the device in the open and closed positions. This embodiment is also within the scope of the invention.

Additional embodiments may employ more than two hinge platforms. The number of pins used to operate such alternative embodiments can be readily determined by the skilled person and as such, these alternative embodiments are also with the scope of the invention.

Another aspect of the invention is a kit for retrofitting a top drive with a pair of torque restraints, or a kit for retrofitting a top drive and travelling block combination with torque restraints according to the embodiments described hereinabove.

Another aspect of the invention is a top drive having integrally formed torque restraints or a top drive and travelling block combination with integrally formed torque restraints according to the embodiments described hereinabove. The positioning of the torque restraints in these integral systems may be identified by the skilled person without undue experimentation and the integral connections may be made by conventional processes such as welding.

Equivalents and Scope

The terms "one," "a," or "an" as used herein are intended to include "at least one" or "one or more," unless otherwise indicated.

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs.

While this invention has been particularly shown and described with references to embodiments thereof, it will be understood by those skilled in the art that various changes in form and details may be made therein without departing from the scope of the invention encompassed by the appended claims.

The invention claimed is:

1. A torque restraint device for connection to a top drive or to a travelling block of a drilling rig, the device reversibly connectable to a guide track connected to a mast of the drilling rig, the device comprising a main body supporting a pair of lockable jaws connected with a hinge body, the jaws configured to form a closed and locked bracket for engaging the guide track and configured to pivot on the hinge body to provide an open bracket to facilitate disengagement of the device from the guide track, wherein the hinge body forms a connection between at least one of the jaws and the main body, wherein one jaw of the pair of jaws is a stationary jaw and the other jaw of the pair of jaws is a pivot jaw pivotable on the hinge body, the pivot jaw provided with a pivot arm connectable to the hinge body, wherein the hinge body is a hinge platform formed of two parallel shelves with aligned hinge pin holes and two sets of aligned locking pin holes, the device further including a hinge pin for insertion into the hinge pin holes to provide the pivoting movement of the pivot jaw between a closed form providing the closed bracket and an open form providing the open bracket, the device further comprising a locking pin for insertion into one or the other of the two sets of aligned locking pin holes to lock the jaws in either the closed or open positions by locking the pivot arm of the pivot jaw to one or the other of the two sets of aligned locking pin holes.

2. The torque restraint device of claim 1, wherein the hinge pin and the locking pin have substantially identical dimensions and the hinge pin holes and the locking pin holes have substantially identical dimensions.

3. The torque restraint device of claim 1, wherein the hinge pin and the locking pin have integrally formed or removable upper tabs to facilitate removal of the hinge pin and the locking pin from their respective hinge pin holes and locking pin holes.

4. The torque restraint device of claim 1, wherein the hinge pin holes in the parallel shelves are located substantially centrally between the two sets of aligned pin lock holes.

5. The torque restraint device of claim 1, wherein the stationary jaw is permanently attached to the main body.

6. The torque restraint device of claim 1, wherein the pair of jaws has interior surfaces at least partially covered with replaceable plastic material to provide sliding surfaces for sliding along the guide tracks of the drilling rig.

7. The torque restraint device of claim 2, wherein the hinge pin and the locking pin have integrally formed or removable upper tabs to facilitate removal of the hinge pin and the locking pin from their respective hinge pin holes and locking pin holes, wherein the hinge pin holes in the parallel shelves are located substantially centrally between the two sets of aligned pin lock holes, wherein the stationary jaw is permanently attached to the main body; and wherein the pair of jaws has interior surfaces at least partially covered with replaceable plastic material to provide sliding surfaces for sliding along the guide tracks of the drilling rig.

8. A top drive for a drilling rig having a pair of torque restraint devices as recited in claim 1 attached at opposed lateral positions of the top drive for connection to opposing guide tracks of a mast of a drilling rig.

9. A travelling block for a drilling rig having a pair of torque restraint devices as recited in claim 1 attached at opposed lateral positions of the travelling block for connection to opposing guide tracks of a mast of a drilling rig.

10. A kit for assembling torque restraints on a top drive of a drilling rig, the kit comprising a pair of torque restraints as recited in claim 1 together with instructions for installation of the torque restraints on the top drive.

11. A kit of for assembling torque restraints on a top drive and a travelling block of a drilling rig, the kit comprising two pairs of torque restraints as recited in claim 1, together with instructions for installation of one of the pair of torque restraints on the top drive and the other of the pair of torque restraints on the travelling block.

12. The kit of claim 11, further comprising instructions for engaging and disengaging the torque restraint devices from guide tracks of the drilling rig.

13. A torque restraint device for connection to a top drive or to a travelling block of a drilling rig, the device reversibly connectable to a guide track connected to a mast of the drilling rig, the device comprising:
    a main body;
    a pair of lockable jaws supported by the main body and connected with a hinge body, the jaws configured to form a closed and locked bracket for engaging the guide track and configured to pivot on the hinge body to provide an open bracket to facilitate disengagement of the device from the guide track, wherein one jaw of the pair of jaws is a stationary jaw and the other jaw of the pair of jaws is a pivot jaw pivotable on the hinge body, the pivot jaw provided with a pivot arm connectable to the hinge body, wherein the hinge body forms a connection between at least one of the jaws and the main body, wherein the hinge body is a pair of hinge platforms located at opposite ends of the torque restraint device, each hinge platform formed of two parallel shelves with aligned hinge pin holes and two sets of aligned locking pin holes;
    a hinge pin for insertion into the hinge pin holes to provide the pivoting movement of the pivot jaw between a closed form providing the closed bracket and an open form providing the open bracket; and
    a locking pin for insertion into one or the other of the two sets of aligned locking pin holes to lock the jaws in either the closed or open position by locking the pivot arm of the pivot jaw to one or the other of the two sets of aligned locking pin holes.

14. The torque restraint device of claim 13, wherein the hinge pins and the locking pins each have substantially identical dimensions and the hinge pin holes and the locking pin holes have substantially identical dimensions.

15. The torque restraint device of claim 13, wherein the hinge pins and the locking pins each have integrally formed or removable upper tabs to facilitate removal of the hinge pins and the locking pins from their respective hinge pin holes and locking pin holes.

16. The torque restraint device of claim 13, wherein the hinge pin holes in the parallel shelves are located substantially centrally between the two sets of aligned pin lock holes.

17. The torque restraint device of claim 13, wherein the stationary jaw is permanently attached to the main body.

18. The torque restraint device of claim 13, wherein the pair of jaws has interior surfaces at least partially covered with replaceable plastic material to provide sliding surfaces for sliding along the guide tracks of the drilling rig.

19. The torque restraint device of claim 14, wherein the hinge pins and the locking pins each have integrally formed or removable upper tabs to facilitate removal of the hinge pins and the locking pins from their respective hinge pin holes and locking pin holes; wherein the hinge pin holes in the parallel shelves are located substantially centrally between the two sets of aligned pin lock holes; wherein the stationary jaw is permanently attached to the main body; and wherein the pair of jaws has interior surfaces at least partially covered with replaceable plastic material to provide sliding surfaces for sliding along the guide tracks of the drilling rig.

20. A top drive for a drilling rig having a pair of torque restraint devices as recited in claim 13 attached at opposed lateral positions of the top drive for connection to opposing guide tracks of a mast of a drilling rig.

21. A travelling block for a drilling rig having a pair of torque restraint devices as recited in claim 13 attached at opposed lateral positions of the travelling block for connection to opposing guide tracks of a mast of a drilling rig.

22. A kit for assembling torque restraints on a top drive of a drilling rig, the kit comprising a pair of torque restraints as recited in claim 13 together with instructions for installation of the torque restraints on the top drive.

23. A kit for assembling torque restraints on a top drive and a travelling block of a drilling rig, the kit comprising two pairs of torque restraints as recited in claim 13, together with instructions for installation of one of the pair of torque restraints on the top drive and the other of the pair of torque restraints on the travelling block.

24. The kit of claim 23, further comprising instructions for engaging and disengaging the torque restraint devices from guide tracks of the drilling rig.

\* \* \* \* \*